United States Patent [19]
Kolb et al.
[11] 4,335,063
[45] Jun. 15, 1982

[54] METHOD AND APPARATUS FOR PRESSURE CONTROL IN A PRESS

[75] Inventors: Dieter Kolb; Eugen Kopp, both of Stuttgart; Manfred Müller-Sybrichs, Shöckingen, all of Fed. Rep. of Germany

[73] Assignee: Werner & Pfleiderer, Stuttgart, Fed. Rep. of Germany

[21] Appl. No.: 47,780

[22] Filed: Jun. 11, 1979

[30] Foreign Application Priority Data

Jun. 13, 1978 [DE] Fed. Rep. of Germany ....... 2825795

[51] Int. Cl.$^3$ ......................... C06B 21/00; B29C 3/06

[52] U.S. Cl. .................................... 264/3 B; 264/40.5; 425/150

[58] Field of Search ...................... 264/3 B, 177, 40.5; 425/149, 150

[56] References Cited

U.S. PATENT DOCUMENTS 3,647,309 3/1972 Thompson .......................... 425/150
3,689,188 9/1972 Kopp .................................. 425/376
3,825,386 7/1974 Bello et al. .......................... 425/150
3,857,658 12/1974 Muzsnay ............................. 425/150
3,893,792 7/1975 Laczko ............................... 425/149
4,076,780 2/1978 Ditto ................................. 264/40.5
4,161,380 7/1979 Bishop ................................ 425/149

FOREIGN PATENT DOCUMENTS 2412341 10/1974 Fed. Rep. of Germany ...... 425/149

*Primary Examiner*—Edward A. Miller
*Attorney, Agent, or Firm*—Browdy and Neimark

[57] ABSTRACT

A method for the multi-stage compression of a mass in a press, especially an extrusion press containing plastic or elastic masses. The mass to be extruded is precompressed up to a preliminary pressure by the rapid advance of the pressure piston. The initial advance takes place at a high rate without the occurrence of impermissibly high temperatures of the mass or the enclosed gas. The subsequent compression to higher pressure levels takes place in a sequence of stages in each of which the rate of advance of the pressure piston is constant. The rate of advance is increased from stage to stage until a final extrusion pressure is reached. An apparatus for carrying out the method of the invention includes a hydraulic flow rate regulator which is controlled on the basis of signals that are related to the pressure measured in the hydraulic system. The pressure signals may be derived by potentiometers energized by pressure-dependent switches.

5 Claims, 2 Drawing Figures

METHOD AND APPARATUS FOR PRESSURE CONTROL IN A PRESS

FIELD OF THE INVENTION

The invention relates to presses, especially extrusion presses for plastic or elastic masses. More particularly, the invention relates to an extrusion press in which the mass is precompressed until a preliminary pressure is reached after which the pressure is increased until the extrusion pressure is reached.

BACKGROUND OF THE INVENTION

When the pressure cylinder of an extrusion press is filled with an explosive mass, for example a mass intended for propellant charges or when propellant material is placed in the pressure cylinder in the form of rolled sheets, it is often impossible to prevent air or other gases from being included in the pressure cylinder. If the pressure in the pressure cylinder is increased too rapidly, i.e., if the compression is increased at too high a rate, either during the precompression process or during the extrusion process, the enclosed gas is compressed nearly adiabatically. During the adiabatic compression, the gas may reach the ignition temperature of the surrounding compressed explosive mass, resulting in burning or explosion.

OBJECT AND SUMMARY OF THE INVENTION

It is a principal object of the present invention to provide a method for extruding explosive masses in which the temperatures reached during the compression remain below dangerous ignition temperatures yet in which an optimum compression rate is achieved. It is an associated object of the invention to provide a switching and control apparatus for carrying out the method of the invention.

These and other objects are attained according to the invention by providing that the mass in the pressure cylinder is precompressed at a preliminary, arbitrarily high rate and that thereafter, the compression takes place in several stages, of increasing compression rate but with the compression rate remaining substantially constant for each of the several stages of compression. The aforementioned method is the result of the unexpected finding that it is possible to increase the initial pressure at the lower levels of pressure at an arbitrarily high rate until a predetermined temperature, for example 385° K. is reached and that the preliminary compression may be adiabatic. When the preliminary pressure has been reached however, the rate of compression must be substantially reduced although it is thereafter gradually increased in several stages. The theoretical reason for this unexpected behavior is that the pressure cylinder contains a heterogeneous mixture consisting of the mass to be extruded, i.e., substantially solids, and an included gas. The manner in which the compression rate is increased in the various separate stages depends on a limited degree on the type of mass to be extruded and also on the proportion of air or gas which is present at the beginning of the compression. The normal gas or air content at the outset can be assumed to be 4% of the volume at 1 bar of pressure and a temperature of 293° K. Under these initial conditions, a suitable preliminary pressure level may be, for example, $\leq$3 bar.

When explosive masses are being compressed, it is customary to apply a vacuum to the pressure cylinder. The better this vacuum is, the greater can be the rate of compression. However, in some instances, the masses to be compressed contain solvents and it is not possible to evacuate the pressure cylinder during the compression. The method according to the invention is particularly applicable to this situation because it permits a rapid initial adiabatic compression up to the preliminary pressure level and thereafter a substantially isothermal further compression and permits an overall compression which is reasonably rapid and economical.

It is a feature of the invention to permit the simple and inexpensive changeover from one pressure level to the other by providing a controller which responds to voltages supplied sequentially by a set of potentiometers energized one by one by a switch controlled by a pressure sensor.

Other advantages and characteristics of the invention will become apparent from the following description which relates to the drawing.

DESCRIPTION OF THE PREFERRED EMBODIMENT

Figure 1:
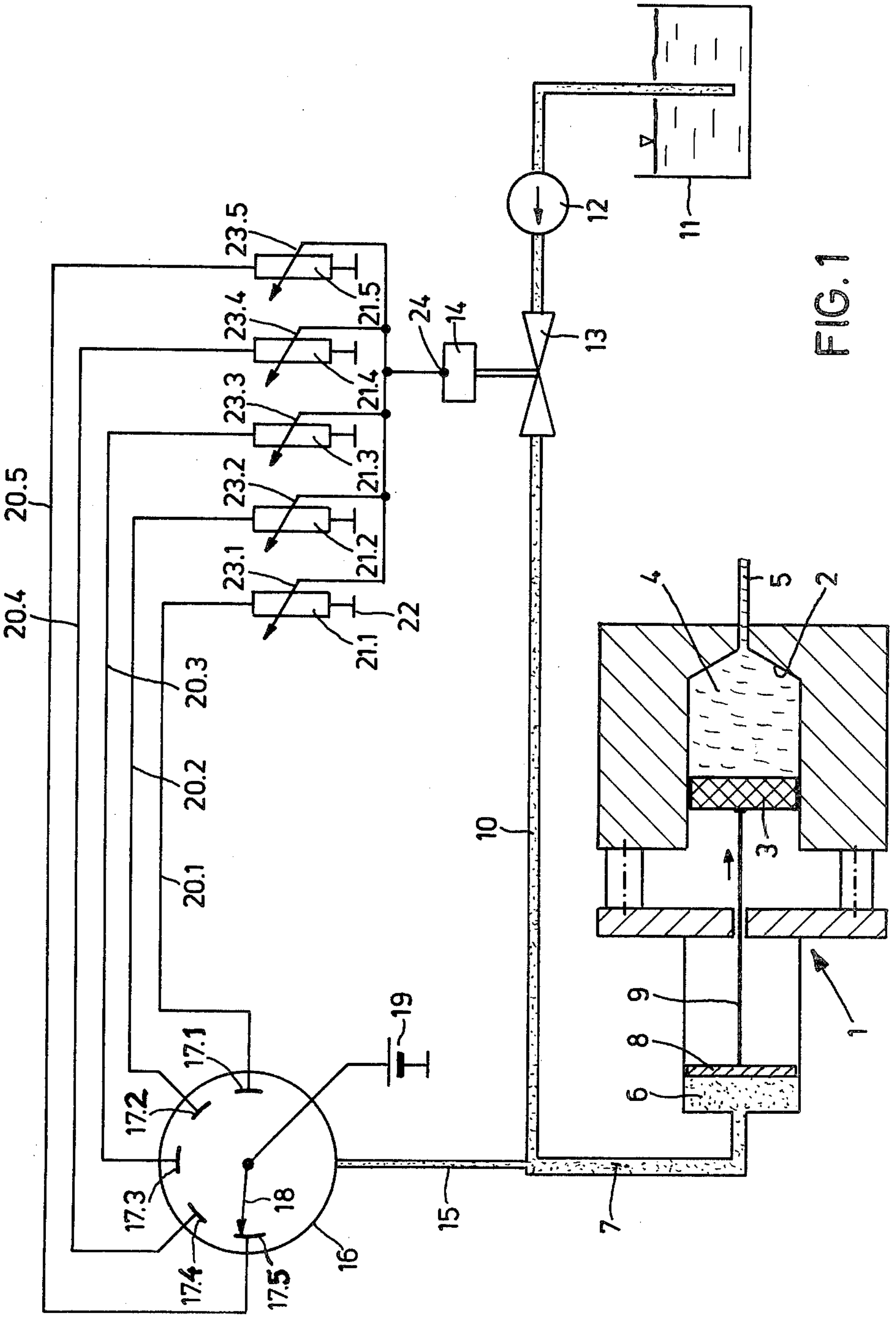
FIG. 1 is a schematic diagram illustrating an extrusion press and the pressure control system according to the invention.

Illustrated in FIG. 1 in symbolic and simplified manner is an extrusion press 1, for example of the type described in U.S. Pat. No. 3,689,188. This press serves especially for extruding explosive masses and has a removable pressure pot which is lifted when an explosion occurs and the internal pressures become excessive and which thereby prevents damage to or destruction of the press during a detonation of the included material. The press may also include frangible elements that relieve the pressure during a detonation. However, a detonation or explosion is always undesirable and may damage the press in ways not immediately evident. Furthermore, such detonation or explosion destroys the charge and requires servicing of the press. The method according to the invention expressly prevents such detonation or explosion and thus avoids the necessary disruptions of the production during such events.

The extrusion press 1 illustrated in FIG. 1 includes a pressure cylinder 2 containing a pressure piston 3 compressing an extruding mass 4, thereby producing an extruded object 5. The pressure piston 3 is advanced by a hydraulic cylinder 6 having a hydraulic piston 8 which is moved by hydraulic fluid 7. The hydraulic piston 8 is connected to the pressure piston 3 by a ram 9. The hydraulic cylinder 6 is connected to a hydraulic line 10 which is supplied with pressurized fluid by a pump 12 taking fluid from a reservoir 11. The line 10 contains a flow regulator 13 which is controlled by a controller 14 that can be adjusted to cause predetermined, constant quantities of fluid to pass the regulator 13 and engage the pressure piston 8.

Branching off from the hydraulic supply line 10 is a measuring line 15 leading to a switching manometer 16 which contains a number of electrical contacts 17.1, 17.2, 17.3, 17.4 and 17.5. These contacts can be selectively connected to one terminal of a battery 19, the other electrode of which is grounded. The contacts 17.1–17.5 are connected, respectively via lines 20.1–20.5, to respective potentiometers 23.1–23.5. The taps 21.1–21.5 of the potentiometers 23.1–23.5 are joined at an input 24 of the controller 14.

Figure 2:
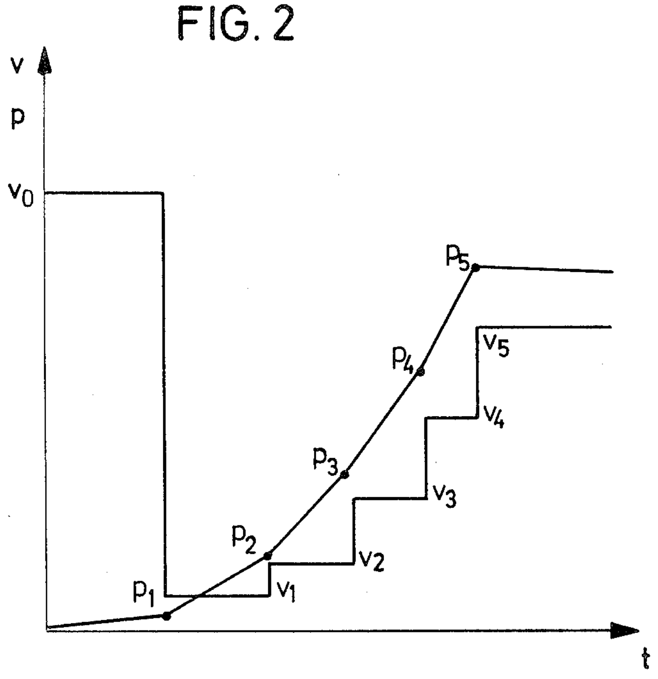
FIG. 2 is a diagram illustrating the pressure and the compression rate as a function of time.

The apparatus and method according to the invention operate in the following manner (see FIG. 2).

Each of the contacts 17.1–17.5 on the switching manometer 16 is related to a particular pressure in the line 15, in the sense that when a particular pressure is reached, the contact arm 18 will move to the particular contact 17.1 with which it is correlated. Thus, when the pressure in the line 15 increases, the switching arm 18 sequentially makes contact with the various contacts 17.1–17.5. The energization of a particular contact causes the energization of the associated potentiometer 21.1–21.5. The voltages applied to the input 24 of the controller 14 may be preadjusted and correspond to the flow rates of pressurized hydraulic medium through the regulator 13. Accordingly, depending on which of the potentiometers 21.1–21.5 is energized, the regulator 13 permits different rates of flow and thus different compression rates $v_1$, $v_2$, $v_3$, $v_4$, or $v_5$ of the pressure piston 3.

The overall process of compression starts at a pressure $p_o$ and at any desired initial rate $v_0$ of the hydraulic piston 8 and the pressure piston 3. The initial arbitrarily high rate is continued until the mass 4 experiences a preliminary pressure $p_1$ which may be in practice approximately 3 bar for the compression of propellant charges.

The level of the preliminary compression speed $v_0$ is limited only by the power of the hydraulic pump 12.

When the preliminary pressure $p_1$ is reached, the rate of compression v is reduced to a substantially lower value $v_1$. The magnitude of the rate $v_1$ is adjusted by an appropriate adjustment of the potentiometer 21.1. The process of compression is now continued at the constant speed $v_1$ until a pressure $p_2$ is reached and sensed by the manometer 16. At this point, the manometer switches from the contact 17.1 to the contact 17.2, thereby energizing the potentiometer 21.2 and causing a different input signal to be applied to the controller 14 which accordingly adjusts a new compression rate $v_2$. This process is repeated through the various pressure levels $p_2$, $p_3$, $p_4$ and the associated compression rates $v_2$, $v_3$, $v_4$ until the maximum extrusion pressure level $p_5$ is reached. At this point, the last switch is performed to engage a compression rate $v_5$ as dictated by the setting of the potentiometer 21.5. When the extrusion takes place at this constant rate, the internal pressure decreases slightly. At the termination of the extrusion process, the hydraulic supply is arrested by actuating electrical limit switches, not shown. The electrical contacts 17.1–17.5 in the switching manometer 16 perform the function of individual pressure-responsive signal generators.

The foregoing description relates to an exemplary embodiment of the invention and other embodiments and variants are possible without departing from the scope of the invention.

We claim:

1. A method for controlling the compression of, and plastic or elastic, explosive mass which may have gas therein and contained in the pressure cylinder of a press, especially of an extrusion press, which includes a pressure piston, comprising the steps of:

advancing said pressure piston against said explosive mass at an arbitrarily high rate (FIG. 2, $v_o$) until a preliminary pressure level (FIG. 2, $p_1$) is reached:

reducing the rate of advance of said pressure piston against said explosive mass to a substantially lower value (FIG. 2, $v_1$); and continuing the advance of said pressure piston against said explosive mass in sequential stages (FIG. 2, $v_2$–$v_5$) until extrusion pressure is reached, each stage of said sequential stages having a respective, higher rate of advance than the immediately preceding stage of said sequential stages and the respective rate of advance being substantially constant during each respective stage of said sequential stages.

2. A method according to claim 1, wherein said preliminary pressure level is $\leqq 3$ bar.

3. An apparatus for controlling the compression of a plastic or elastic explosive mass which may have gas therein and is contained in the pressure cylinder of a press, especially of an extrusion press, which includes a pressure piston actuated by a hydraulic system, comprising:

a flow regulator in said hydraulic system for regulating the flow-rate of hydraulic fluid which actuates said pressure piston;

a plurality of pressure-sensitive signal generators, for generating input signals for a controller in dependence of pressure in said hydraulic system; and a controller for controlling said flow regulator in dependence on a first and subsequent input signals from said signal generators, said controller initially effecting advance of said pressure piston at an arbitrarily high rate until a preliminary pressure level, as sensed by said pressure-sensitive signal generators, is reached, then effecting a reduction of the rate of advance of said pressure piston to a substantially lower value, and thereafter effecting a continuation of the advance of said pressure piston in sequential steps determined by sequential appearances of said subsequent input signals from respective ones of said signal generators, each step of said sequential steps having a higher rate of advance than the preceding step of said sequential steps, and the respective rate of advance being substantially constant during each respective step of said sequential steps.

4. An apparatus according to claim 3, wherein said pressure-sensitive signal generators include a plurality of potentiometers for supplying a plurality of different pressure-related signals to said controller.

5. An apparatus according to claim 4, wherein each of said potentiometers is connected between a pressure-dependent switch and the input of said controller.

* * * * *